United States Patent [19]
Omnes

[11] Patent Number: 5,475,187
[45] Date of Patent: Dec. 12, 1995

[54] STRING OF SONDES

[75] Inventor: Gildas Omnes, L'Hay-les-Roses, France

[73] Assignee: Compagnie Generale de Geophysique, Massy, France

[21] Appl. No.: 226,645

[22] Filed: Apr. 12, 1994

[30] Foreign Application Priority Data

Apr. 15, 1993 [FR] France .................................. 93 04448

[51] Int. Cl.⁶ .............................. G01V 1/40; E21B 4/18
[52] U.S. Cl. .................. 181/102; 367/25; 175/99
[58] Field of Search ................... 367/25, 86, 911, 367/57; 181/102, 105; 175/99; 166/250, 100

[56] References Cited

U.S. PATENT DOCUMENTS

| | | | |
|---|---|---|---|
| H1232 | 12/1993 | DiSiena ........................................ | 367/57 |
| 2,899,633 | 8/1959 | Smith et al. ................................ | 324/10 |
| 4,616,703 | 10/1986 | Laurent et al. ......................... | 166/66.4 |
| 4,686,653 | 8/1987 | Staron et al. ............................. | 367/25 |
| 4,844,197 | 7/1989 | Maissa ..................................... | 181/105 |
| 5,370,545 | 12/1994 | Laurent .................................... | 166/65.1 |

FOREIGN PATENT DOCUMENTS

| | | |
|---|---|---|
| 2079559 | 11/1971 | France . |
| 2501380 | 9/1982 | France . |
| 2252626 | 8/1992 | United Kingdom . |

*Primary Examiner*—Jan I. Lobo

[57] ABSTRACT

A string of sondes is designed to be lowered down a borehole by means of a cable in order to detect the arrival of seismic waves therein, the sondes including retractable anchor means that are hydraulically actuateable and that are connected by a hydraulic circuit to a common source of hydraulic pressure. The string includes means for putting said hydraulic circuit to ambient pressure, said means being connected to said cable and being adapted to act on said hydraulic circuit in order to cause said anchor means to be retracted when a traction force exceeding a selected value is exerted on said cable.

9 Claims, 15 Drawing Sheets

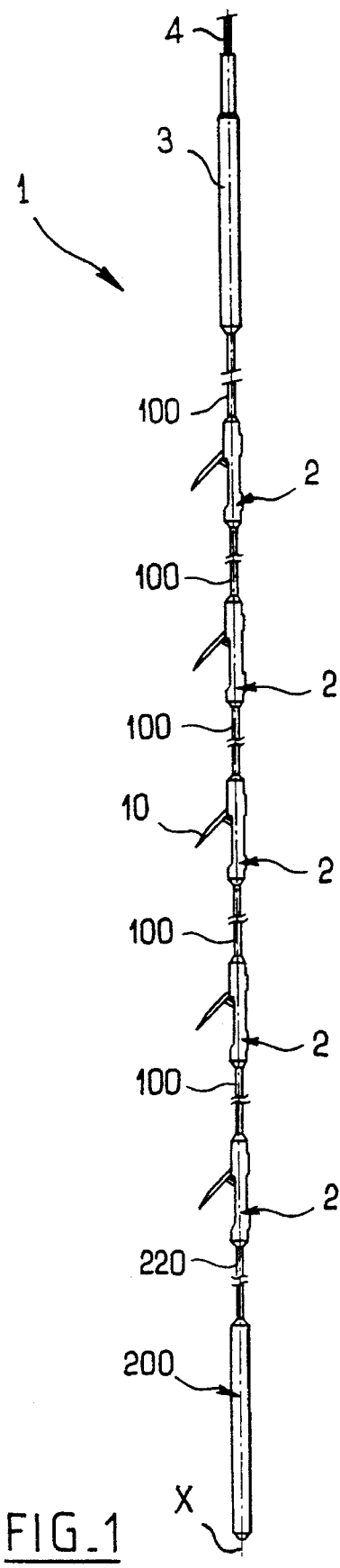
FIG_1
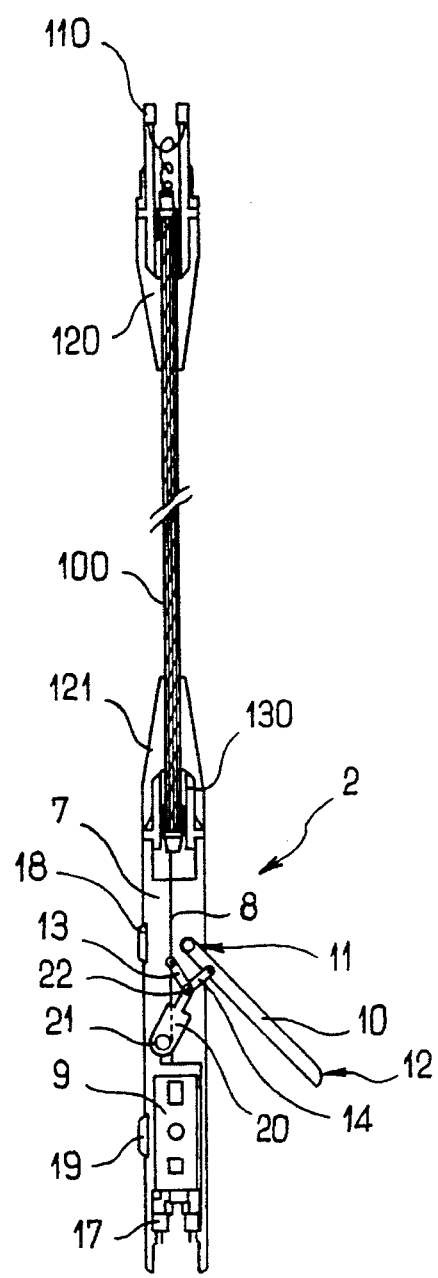
FIG_2

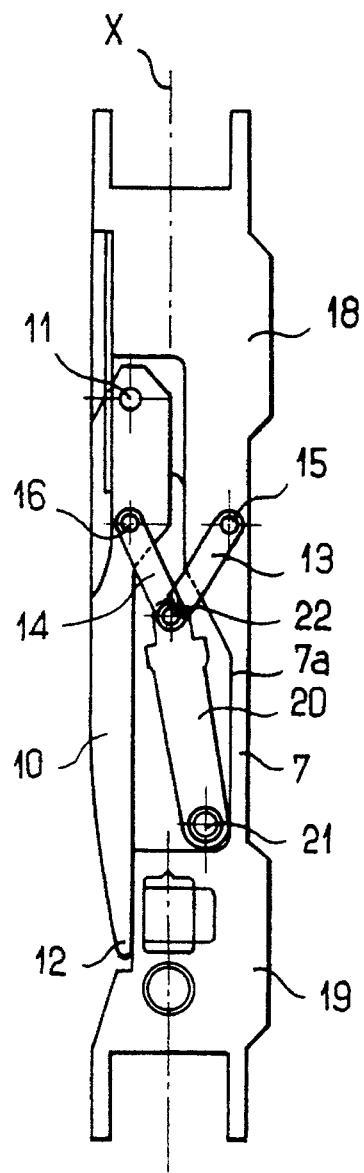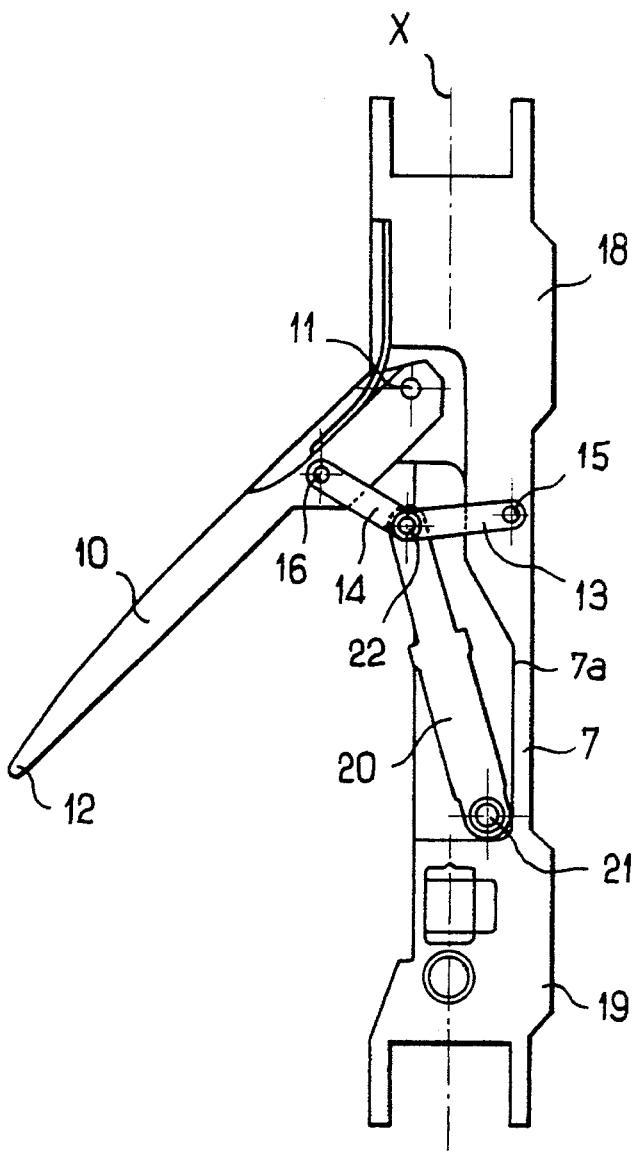
FIG_2A                FIG_2B

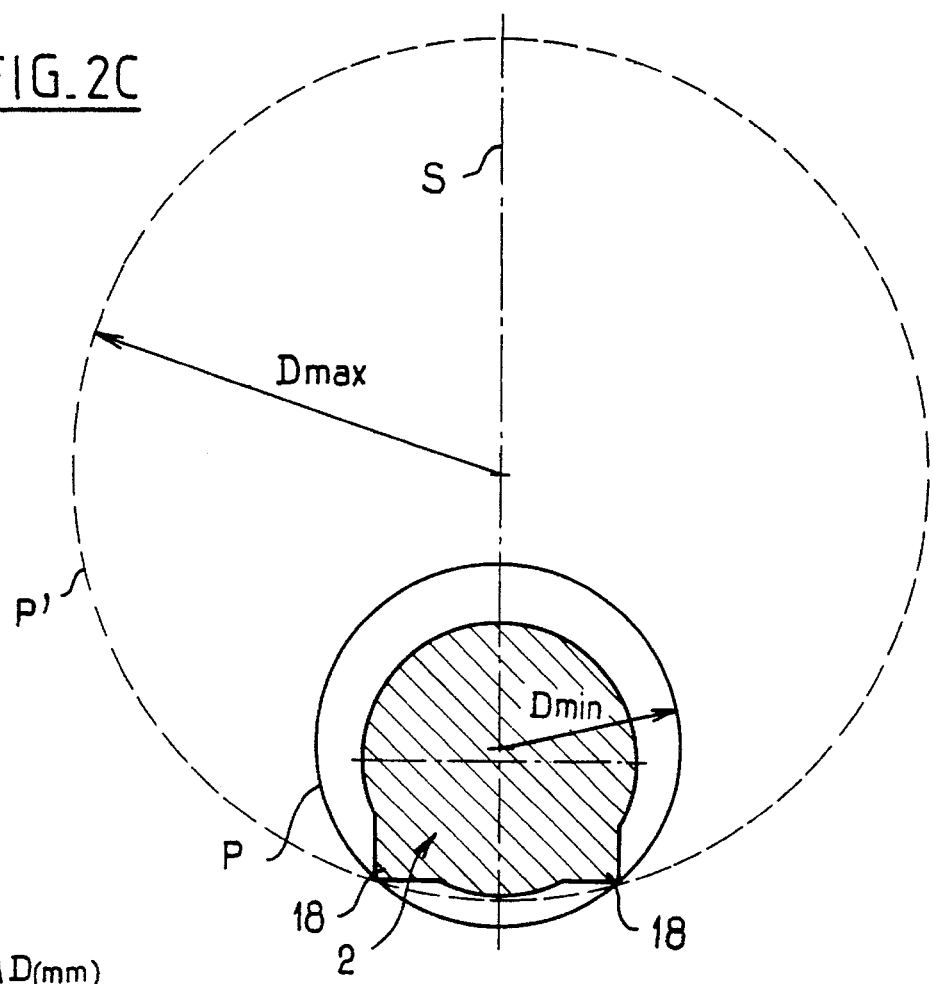
FIG_2C
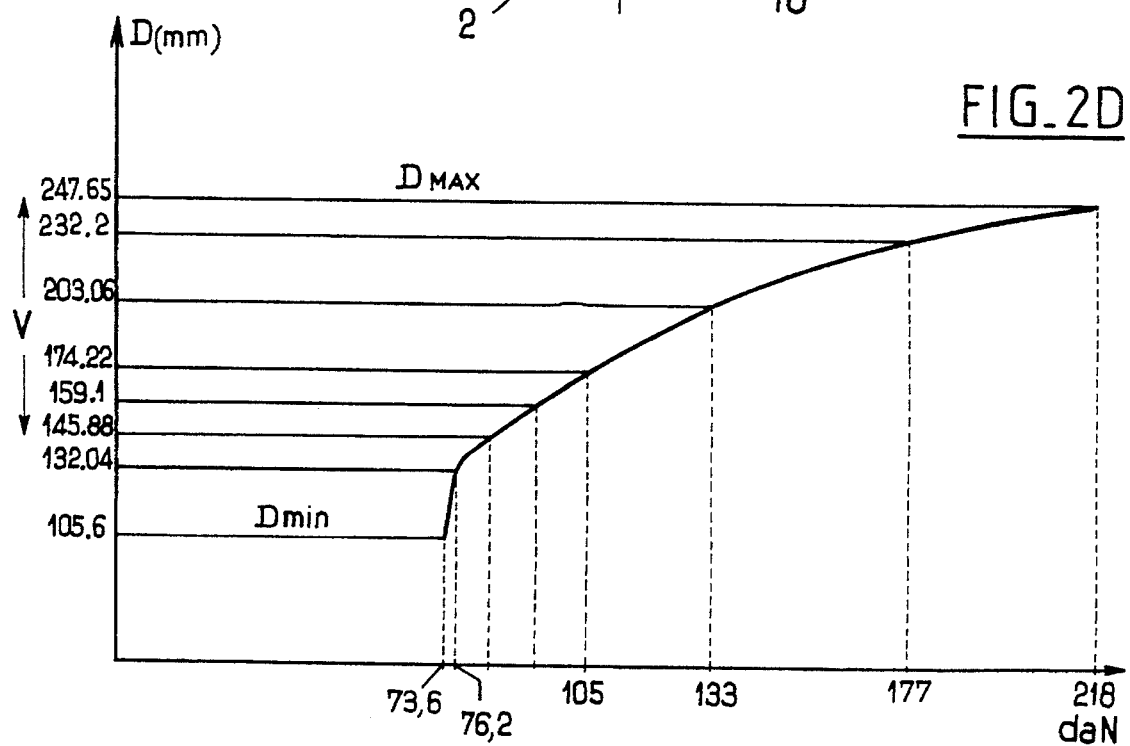
FIG_2D

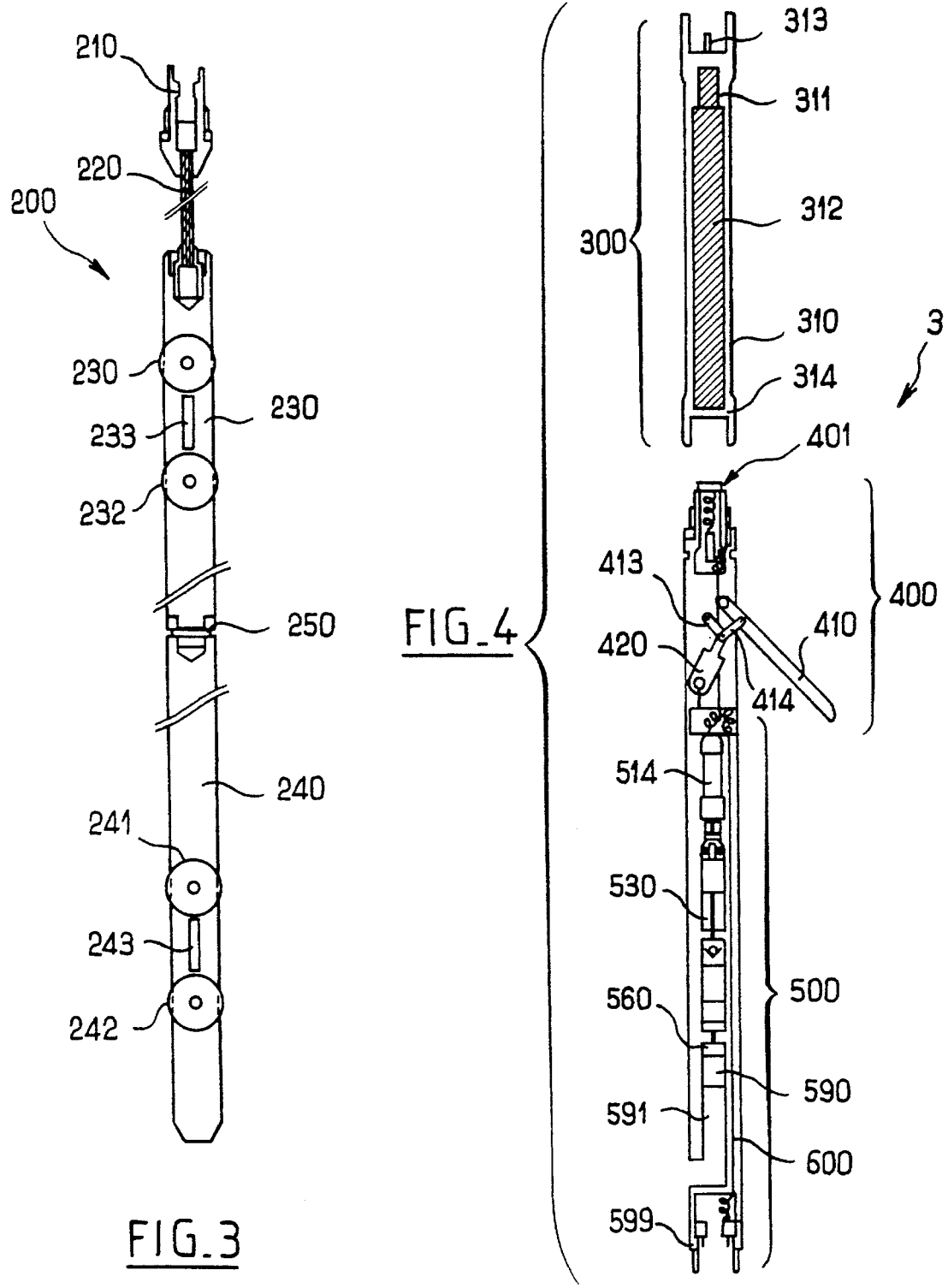

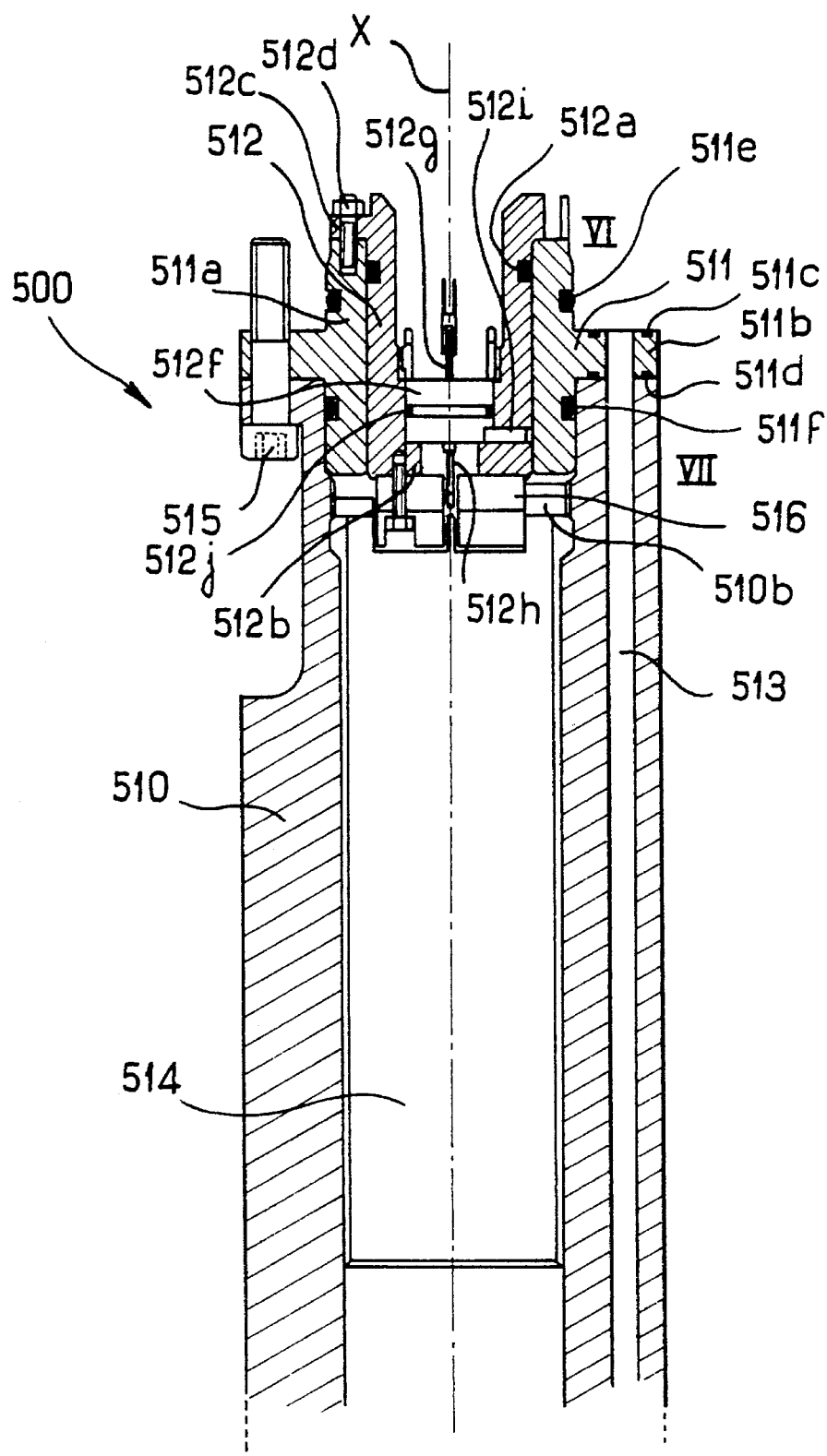
FIG_5A

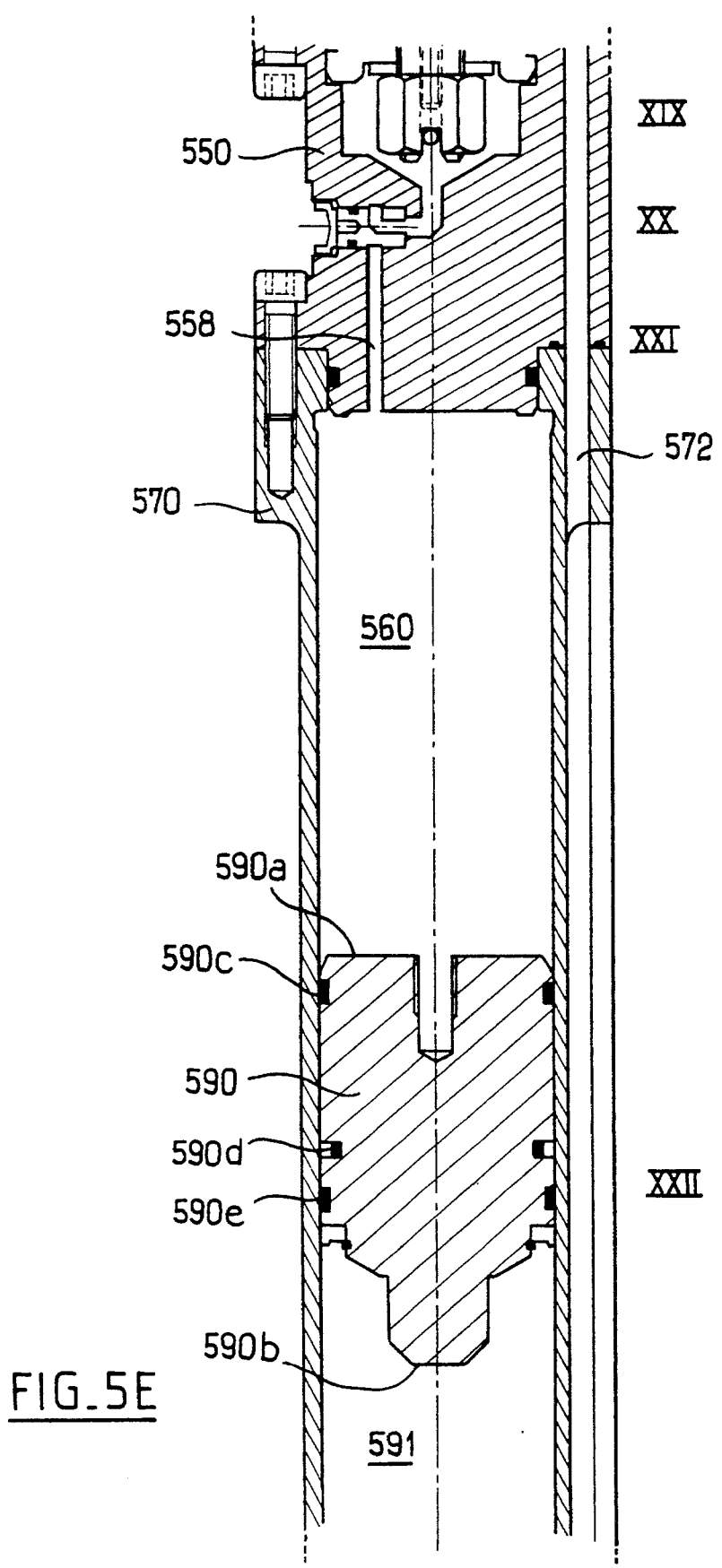
FIG_5E

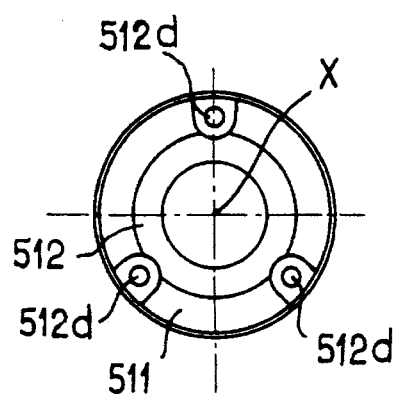
FIG_6
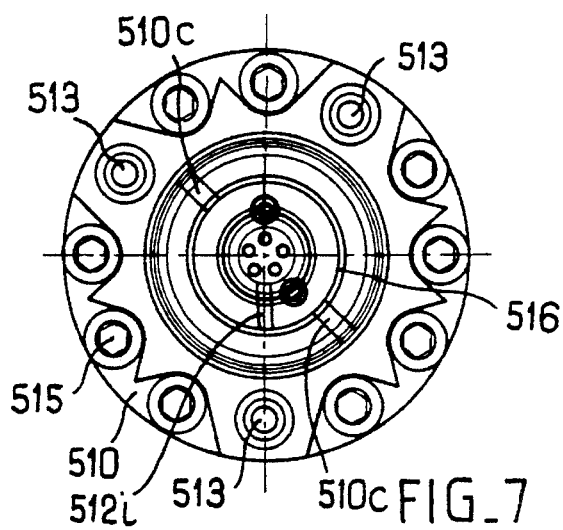
FIG_7
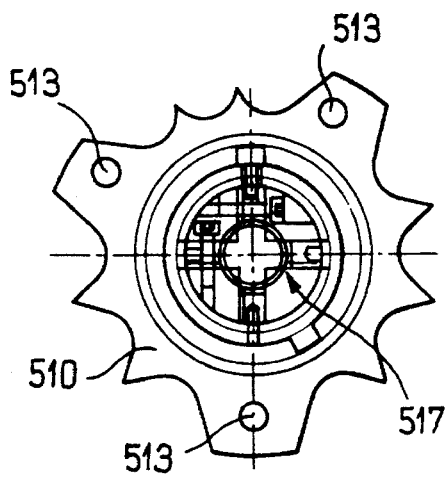
FIG_8
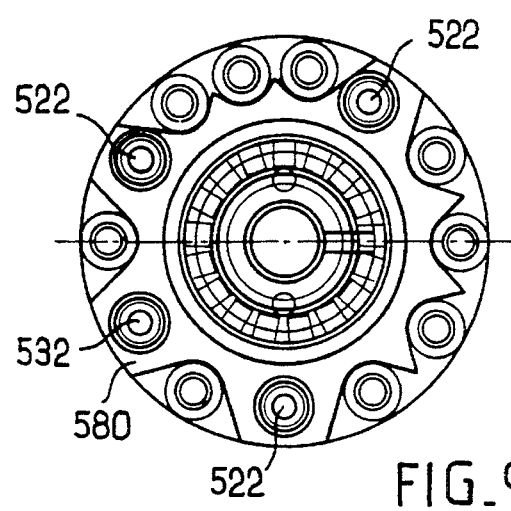
FIG_9
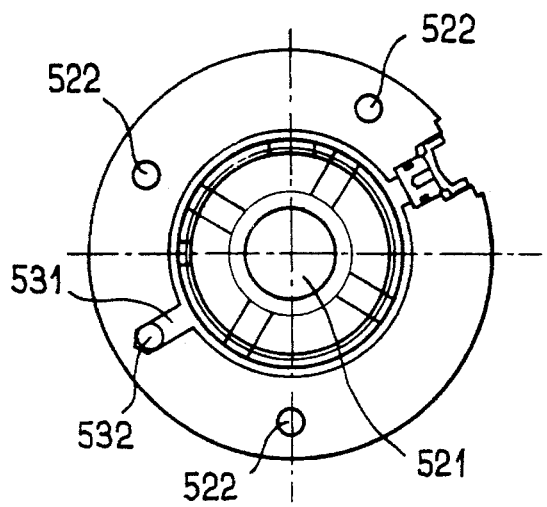
FIG_10
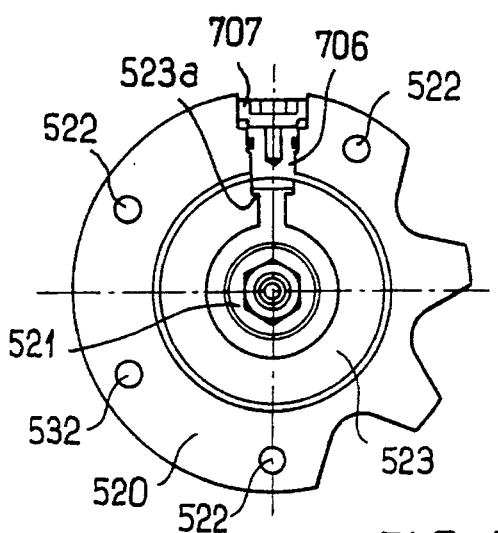
FIG_11

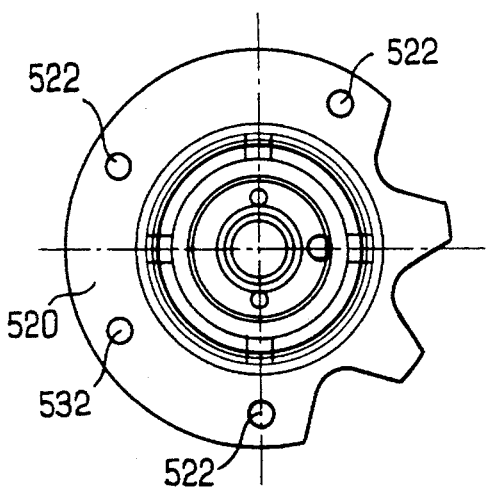
FIG_12
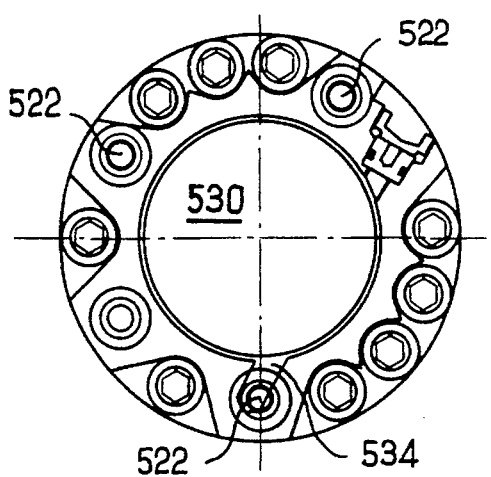
FIG_13
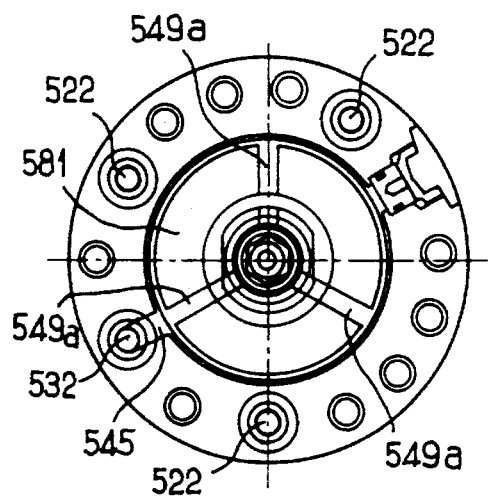
FIG_14
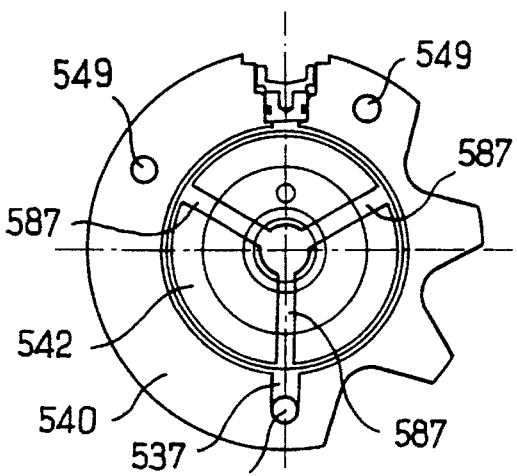
FIG_15
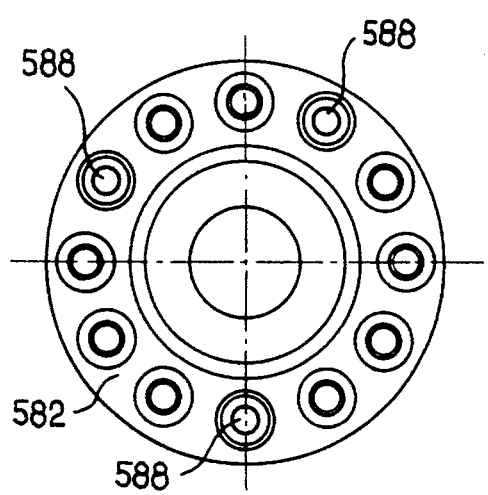
FIG_17
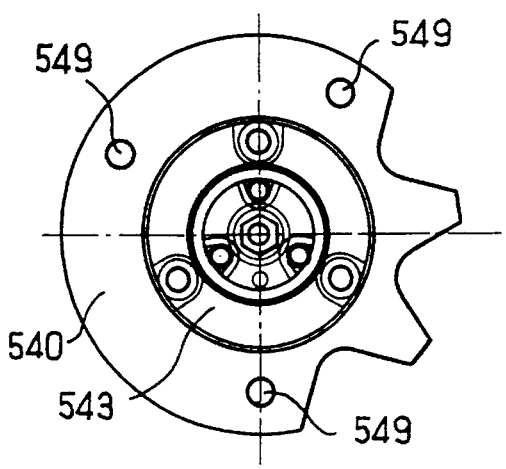
FIG_16

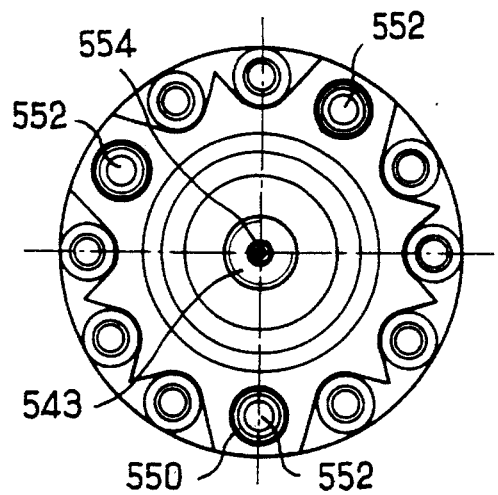
FIG_18
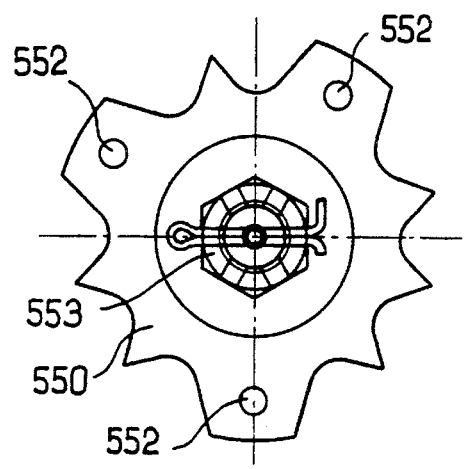
FIG_19
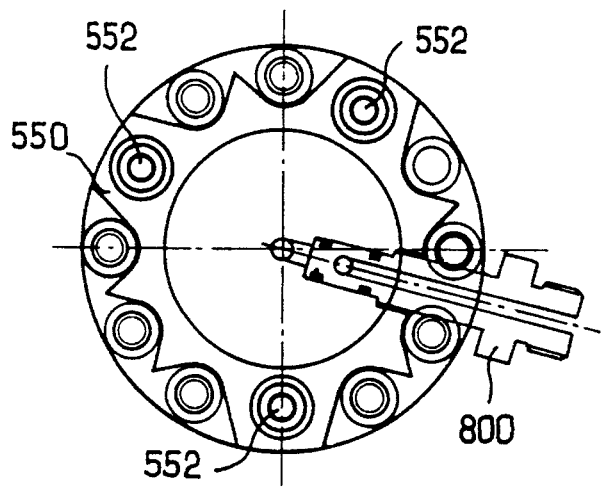
FIG_20
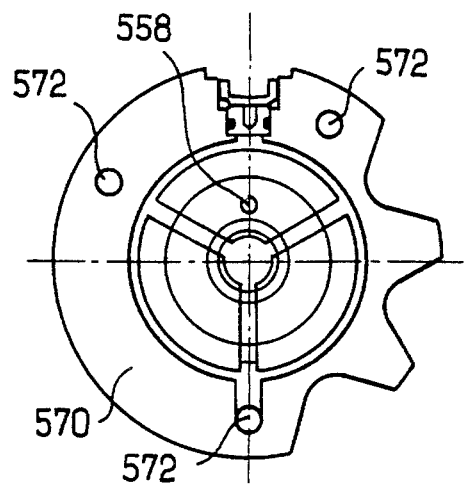
FIG_21
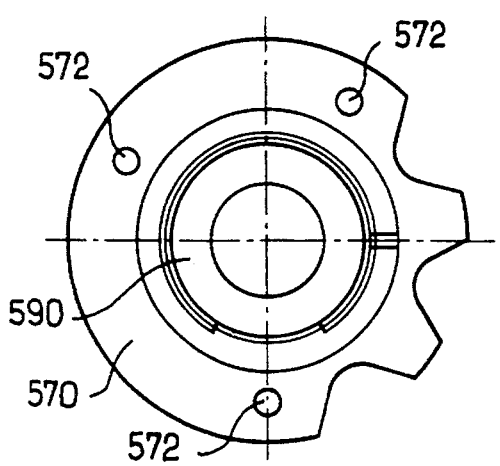
FIG_22
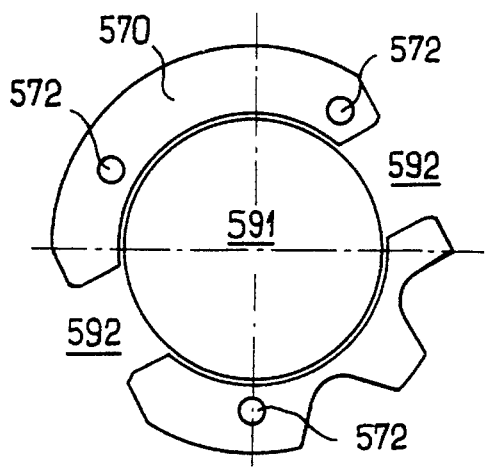
FIG_23

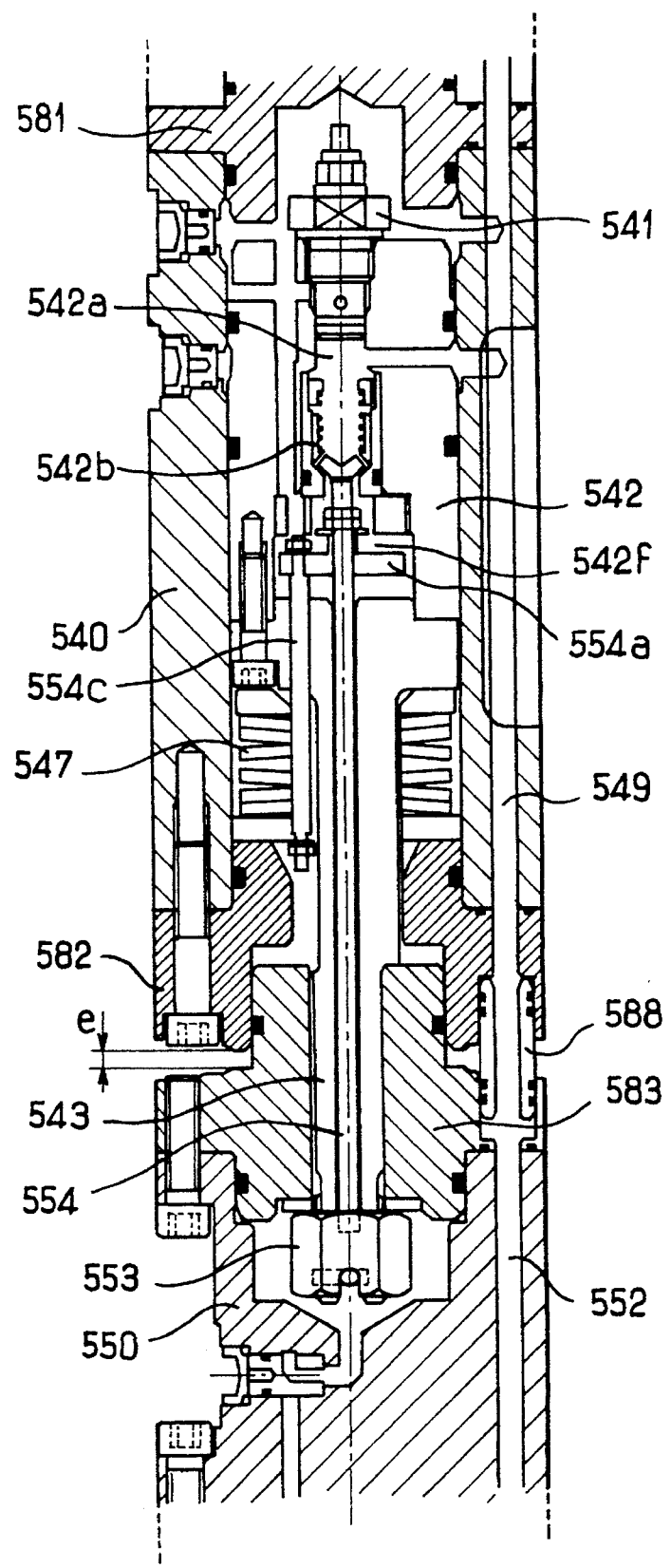
FIG_24

STRING OF SONDES

The present invention relates to the field of seismic prospecting, and more particularly to a string of sondes to be lowered down a borehole by means of a cable for detecting the arrival of seismic waves therein.

BACKGROUND OF THE INVENTION

The trade name Multilock is used to designate a string of sondes each comprising an anchor arm that is displaceable under drive from a spring between a retracted position that enables the string to be lowered down the borehole and an anchored position in which the arm bears against the wall of the borehole to hold the sonde in place. The arm is kept in the retracted position and the spring is kept compressed during lowering by locking means. At the desired depth, the locking means are released, and the arm is moved away from the body of the sonde towards its anchoring position by the spring relaxing. When the string is raised, the anchor arm rubs against the wall of the borehole, which wall may include roughnesses liable to catch the arm, thereby giving rise to damage or to the string being jammed downhole.

French patent application No. 2 672 692 discloses a string of small-sized sondes that includes hydraulically actuateable retractable anchor means connected to a common source of hydraulic pressure. The anchor means are constituted by arms moved away from the sonde body by a rack which is driven by the piston of a hydraulic actuator. The rack is fixed to the piston by means of a shear pin that is designed to break under the effect of an upwardly-directed force, thereby enabling the arm to be folded down when the sonde is to be pulled out from the borehole. The assembly formed by the rack and the piston must be removed from the body of the sonde in order to be repaired.

OBJECTS AND SUMMARY OF THE INVENTION

The present invention seeks to eliminate any risk of loss of or damage to a string while it is being raised, and to this end it provides an improved string of sondes designed to be lowered down a borehole by means of a cable, the sondes including retractable anchor means that are hydraulically actuateable and that are connected by a hydraulic circuit to a common source of hydraulic pressure.

According to a first characteristic of the invention, the string includes means for putting said hydraulic circuit to ambient pressure, said means being connected to said cable and being adapted to act on said hydraulic circuit in order to cause said anchor means to be retracted when a traction force exceeding a selected value is exerted on said cable. Thus, the anchor means can be retracted simultaneously merely by acting on said means for putting said hydraulic circuit to ambient pressure, and there is no need for the sondes subsequently to be disassembled for repair purposes. The said selected value preferably lies in the range 1200 daN to 1600 daN.

The invention also seeks to provide good anchoring of the sondes in the borehole.

In an advantageous embodiment of the invention, for each sonde, the anchor means include an anchor arm moveably connected to the body of the sonde and driveable away therefrom by means of a single-acting hydraulic actuator that is accessible from outside the sonde when the arm is folded out. Maintenance and cleaning operations are thereby facilitated. The anchor arm is hinged at one end to the body of the sonde, and the actuator is pivotally connected at one end to the body of the sonde and at its other end to a common hinge between two links that are hinged to each other at one end and that are hinged at their opposite ends respectively to the body of the sonde and to the anchor arm, such that the force exerted by the anchor arm on the wall of the borehole increases with increasing diameter of the borehole, said increase being greater than 6 N/mm over a range of values of borehole diameter.

Preferably, said range covers more than 70% of the total range defined by the minimum diameter and the maximum diameter at which the sonde can be anchored.

In an advantageous embodiment of the invention, said means for putting the hydraulic circuit to ambient pressure includes two slidably connected elements that are urged towards each other by resilient return means and apart from each other by said traction exerted on the cable, and means forming a non-return valve and actuated by said elements being moved apart, and adapted once the traction force exceeds the selected value, to establish hydraulic communication between said hydraulic circuit and a hydrostatic pressure compensation chamber including a moving wall that is subjected externally to ambient pressure.

Preferably, the sondes are connected to one another by lengths of flex including anti-twisting sheaths. In a variant, the sondes are connected to one another by lengths of rigid tube.

BRIEF DESCRIPTION OF THE DRAWINGS

Other characteristics and advantages of the present invention appear on reading the following detailed description of a non-limiting embodiment of the invention, and on examining the accompanying drawings, in which:

FIG. 1 is a diagrammatic view of a string of sondes in accordance with the invention;

FIG. 2 is a diagrammatic view of a sonde fitted with a coupling flex;

FIGS. 2A and 2B show an anchor arm in its retracted position and in its extended position respectively;

FIG. 2C is a diagrammatic cross-section showing how a sonde is anchored in a borehole;

FIG. 2D shows how the force exerted by the anchor arm on the wall of the borehole varies as a function of the diameter of the borehole;

FIG. 3 is a diagrammatic view of a ballast-forming device fitted to the string of sondes of the invention;

FIG. 4 is a diagrammatic view of a module fitted to a string of sondes of the invention, the module containing the source of hydraulic pressure and the means for putting the hydraulic circuit connecting said source to the sonde to atmospheric pressure;

FIGS. 5A to 5F are successive longitudinal sections through the module shown in FIG. 4;

FIGS. 6 to 23 are a sequence of cross-sections at the levels referenced VI to XXIII respectively in FIGS. 5A to 5F;

FIG. 24 is a fragmentary section showing the effect on the hydraulic circuit of the means for putting it to ambient pressure when traction is exerted on the cable.

MORE DETAILED DESCRIPTION

Figure 5B:
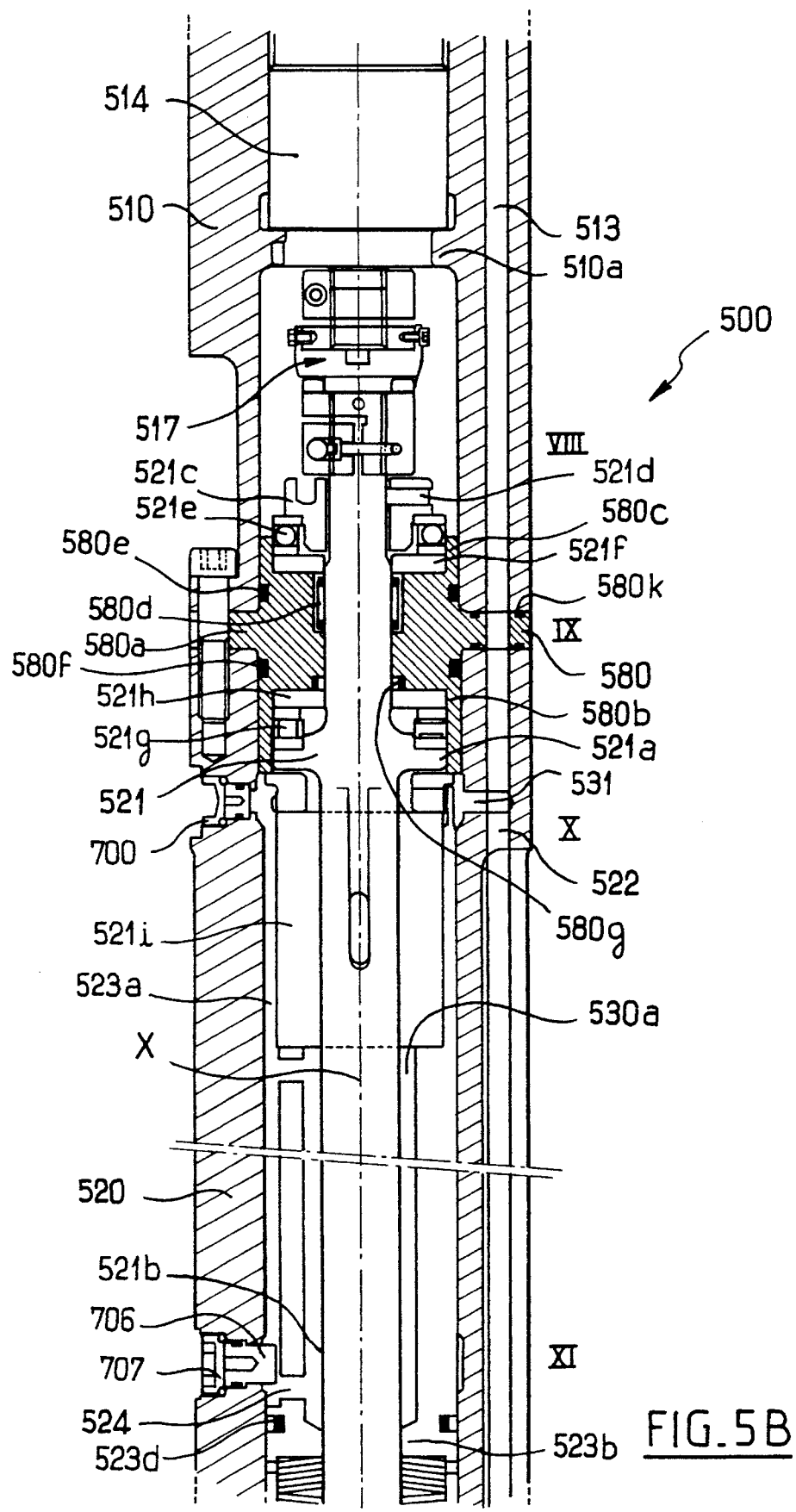

Throughout the following description, terms such as "lower" and "upper" or "bottom" and "top" refer to the orientation of the string when lowered down a vertical borehole, and to the portions of the corresponding elements situated respectively towards the bottom or the top of the figures.

The string 1 of sondes of the invention as shown in FIG. 1 comprises a plurality of identical sondes 2 extending along a vertical longitudinal axis X and connected to one another at their axial ends via lengths of flex 100. The string 1 is designed to be lowered down a borehole filled with drilling mud by means of a cable 4 that connects the string to the surface for detecting the arrival of seismic waves at the string. The bottom end of the string 1 is provided with a ballast-forming device 200 for facilitating lowering of the string 1 down the borehole, which device is connected to the last sonde 2 in the string by a length of cable 220. The first sonde 2 of the string is connected via a flex 100 to the bottom end of a module 3 containing a source of hydraulic pressure, as described in greater detail below. The top end of the module 3 is connected to the cable 4.

In accordance with the invention, the sondes 2 include respective retractable anchor means that are hydraulically actuateable and that are connected via a hydraulic circuit, referred to as the "main" hydraulic circuit, to the above-mentioned source of hydraulic pressure which is common to all of the sondes. The hydraulic fluid used is preferably oil. FIG. 2 shows a sonde 2 provided with a coupling flex 100. The flex is fitted at its ends with connectors and it includes a duct for transmitting hydraulic fluid, together with internal electrical conductors. The internal electrical conductors are advantageously disposed inside the hydraulic fluid duct, thereby protecting them mechanically and reducing the risk of electrical leakage, particularly when the pressure difference between the oil and the drilling mud is positive or zero. This flex preferably includes an anti-twisting sheath so that the sondes 2 are all positioned inside the borehole in the same angular orientation about the axis X.

In a variant, the flex 100 may be replaced by a rigid tube that enables axial forces to be transmitted, thereby making it possible to push the string 1 along a horizontal borehole, for example.

The coupling flex 100 shown in FIG. 2 is provided at its top end with a male connector 120 fitted with electrical contact pins 110 that are electrically connected to the internal conductors of the flex. The bottom end of the flex 100 is connected via a point of localized weakness 130 designed to cause the detachment of the flex whenever a traction force is applied upwardly in excess of a given safety threshold to a connector 121 that is electrically and hydraulically connected to the sonde 2. In the embodiment described, this safety threshold lies in the range 2000 daN to 7000 daN.

The sonde 2 is fitted with an anchor arm 10 moveably connected to the body 7 of the sonde, and driveable away therefrom in a plane that contains the axis X by means of a single-acting hydraulic actuator 20.

Reference 8 is given to communications means that establish a passage for hydraulic fluid and an electrical connection between the above-mentioned connector 121 and a female connector 17 fitted to the bottom end of the sonde 2. The actuator 20 is fed with hydraulic energy from said passage for hydraulic fluid. The sonde 2 includes a set of three triaxial seismic detectors of conventional design.

The mounting details for an anchor arm 10 can be seen in FIGS. 2A and 2B. The top end of the arm 10 is hinged at 11 to the body 7 of the sonde. The actuator 20 is pivotally connected at its bottom end 21 to the body 7 of the sonde and at its opposite end 22 to the hinge between two links 13 and 14. Link 13 is hinged at one end to the end 22 of the actuator 20 and at its other end 15 to the body 7 of the sonde. Link 14 is hinged at one end to the end 22 of the actuator 20 and at its other end 16 to the anchor arm 10. The distance between the hinges 22 and 15 is slightly greater than the distance between the hinges 22 and 16. The axes of the hinges 11, 15, 16, 22, and 21 are parallel and perpendicular to the plane of FIGS. 2A and 2B, such that the anchor arm 10 moves in a plane parallel to the plane of the FIGS. 2A and 2B.

When the anchor arm 10 is in its retracted position, as shown in FIG. 2A, the hinges 15 and 16 are at the same height, the hinges 21, 22, and 11 are substantially in alignment, and the hinge 16 is situated vertically below the hinge 11. Hydraulic energy is fed to the actuator 20 via a rotary joint at its end 21 that is hinged to the sonde body 7. The actuator 20 is situated in a housing 7a inside the body 7 of the sonde and open to the outside transversely to the axis X, such that when the anchor arm 10 is in the deployed position the actuator 20 is easily accessible from the outside without dismantling the sonde.

When the string of sondes is situated at depth in the borehole, the anchor arm is folded in naturally under the effect of hydrostatic pressure. A spring (not shown) is preferably is mounted in conventional manner to act between the arm 10 and the body 7 of the sonde and to exert a return torque that tends to fold in the arm, in order to facilitate folding in of the arm when the string of sondes is in the open air.

In FIG. 2B, the actuator 20 is fed with hydraulic fluid under pressure and pushes the common hinge 22 between the two links 13 and 14 so as to move the arm 10 away from the body 7 of the sonde. The free end 12 of the arm then comes into abutment against the wall of the borehole. The sonde 2 then rests against the wall of the borehole via two pairs of abutments 18 and 19 formed on the body 7 of the sonde on the side thereof that is opposite to the opening of the housing 7a, which abutments are disposed symmetrically on either side of the plane in which the anchor arm 10 moves. These two pairs of abutments 18 and 19 are situated respectively immediately above the hinge 11 of the anchor arm 10 and immediately below the hinge 21 of the actuator 20.

FIG. 2C is in a plane perpendicular to the axis X, and it shows a sonde 2 in its anchored position in the borehole. For reasons of clarity in the drawing, the anchor arm 10 is not shown. Reference S merely designates the plane in which the anchor arm moves, which plane is perpendicular to the plane of FIG. 2C. The sonde 2 bears against the wall P of the borehole via its pair of abutments 18 and 19 (only the pair of abutments 18 can be seen in FIG. 2C). The diameter of the borehole as shown in FIG. 2C corresponds to the minimum diameter $D_{min}$ of borehole in which the sondes can be anchored. Dashed lines show the wall P' of a borehole whose diameter $D_{max}$ corresponds to the maximum diameter in which the sonde 2 can be anchored.

In accordance with an advantageous characteristic of the invention, the force exerted by the anchor arm 10 on the wall P of the borehole increases with borehole diameter. FIG. 2D is a plot applicable to a sonde corresponding to the embodiment described and it shows how the force exerted by the anchor arm 10 against the wall of the borehole varies as a function of the borehole diameter. The force exerted by the anchor arm 10 increases continuously from a value of 73.6 daN corresponding to the minimum diameter $D_{min}$ in which anchoring is possible (equal to 105.6 mm) up to a force of 218 daN corresponding to the maximum diameter at which anchoring can take place (equal to 247.65 mm). Advantageously, this increase is greater than 6 N/mm over a range V of borehole diameters that covers more than 70% of the total range between $D_{min}$ and $D_{max}$, with the value $D_{max}$ constituting the top end of the range V. Given the mass of a sonde 2 which is close to 10 kg, a high ratio is obtained of force exerted by the arm divided by sonde mass, and that enhances the observation of high frequency seismic signals.

FIG. 3 shows the device 200 that serves as ballast. This device is constituted by two elements 230 and 240 each weighing about 150 kg and connected end-to-end at 250. Each element includes three pairs of wheels suitable for running on the wall of the borehole, the pairs of wheels being referenced respectively 231, 232, 233 and 241, 242, 243 for the two elements, the wheels being mounted on each element to rotate about three axes that are perpendicular to the axis X and that are at equal angular intervals of 120° thereabout. The top element 230 is connected to the bottom sonde 2 merely by the above-mentioned length of connection cable 220 which is provided at its top end with a male connector 210.

FIG. 4 shows the above-mentioned module 3 containing the source of hydraulic pressure common to all of the sondes 2. The module 3 is made up of a top element 300 and of a bottom element that is described in greater detail below. The top element 300 is fitted at its top end with a top connector 313 for connection to the cable 4, and at its bottom end with a bottom connector 314 for connection to said bottom element. The top element 300 includes a body 310 that is generally in the form of an elongate tube about the axis X and that houses a gamma ray detector 311 and electronic modules 312 for digitizing the analog signals delivered by the sets 9 of detectors in the sondes 2 for the purpose of transferring the signals to the surface in digital form. The configuration of the string of sondes is particularly suitable for use with so-called "distributed" electronics, of the kind implemented in surface systems for acquiring seismic data and in which the signals are digitized within respective geophones. The said bottom element of the module 3 includes two subassemblies situated one above the other. The subassembly 400 situated above the subassembly 500 is used for anchoring the module 3 in the borehole, and the subassembly 500 includes the source of hydraulic pressure, means for compensating hydrostatic pressure, and means for putting the hydraulic circuit connecting the source to the sondes to ambient pressure.

The subassembly 400 used for anchoring the module 3 includes an anchor arm mechanism similar to that fitted to the sondes 2 and constituted mainly by an arm 410 hinged at one end and actuated by a single-acting actuator 420 that acts on the common hinge between two links 413 and 414 connected respectively to the body of the module 3 and to the anchor arm 410. The top end of the subassembly 400 includes a connector 401 adapted to be connected to the above-mentioned connector 314 to establish electrical and mechanical connection between the two elements. The bottom end of the module 3 includes a female connector 599 designed to be connected to a male connector such as above-mentioned male connector 110, for the purpose of establishing electrical and hydraulic connection with the sondes 2. The connector 401 is connected to the bottom connector 599 via an electrical line 600. The source of hydraulic pressure includes a motor 514 electrically connected to the connector 401 so as to be powered with electricity from the surface.

The subassembly 500 is described below in greater detail with reference to FIGS. 5A et seq. The subassembly 500 is generally in the form of a circular cylinder about the axis X and it includes a stack of four main tubular elements 510, 520, 540, and 570 that are referred below as the first, second, third, and fourth elements, respectively in the downwards direction. These four elements have bores extending lengthwise within the thickness of their walls to define three hydraulic fluid passages that are disposed at angles of 90° and 120° to one another about the axis X. Within each of the four elements, these passages are referenced respectively 513, 522, 549, and 572.

The first and second elements 510 and 520 are united by a first sealing part 580 providing sealed connection between the passages 513 and 522. More particularly, this sealing part 580 has a circularly cylindrical outside surface about the axis X extended radially outwards about halfway up its length to form a flange 580a that is interposed axially between the end faces of the first and second elements 510 and 520. The sealing part 580 has bores that are spaced around the axis X in a manner described below. A second sealing part 581 is of outside shape that is generally similar to that of the first part 580 and it is disposed between the second and third elements 520 and 540, establishing sealed communication between the passages 522 and 549. The first and second elements, and also the second and third elements are united by bolting using flanges formed on the outside surfaces thereof. The parts 580 and 581 have corresponding bores. The third and fourth elements 540 and 570 are slidably connected in a manner described below.

The first element 510 houses the motor 514 together with an associated stepdown gear box. The motor 514 bears via its bottom front face against an inside shoulder 510a formed on the radially inner surface of the element 510, and it is kept in abutment thereagainst by tightening a nut 510b against its top front face, said nut 510b co-operating by means of a screw thread with tapping formed on the radially inner surface of the first element 510. The top face of the nut 510b includes two radial notches 510c for assembly purposes.

The first element 510 is bolted to the subassembly 400 by bolts 515, together with an interposed sealing part 511 whose general outside shape is similar to that of the above-mentioned sealing parts 580 and 581. The sealing part 511 is more particularly in the form of a sleeve 511a that is circularly cylindrical about the axis X and that is inserted in part in the first element 510. About halfway up its outside surface it is extended radially outwards by an annular flange 511b that bears axially against the top end face of the first element 510. The flange 511b has axial bores for passing the bolts 515 and also in register with the passages 513, and on each of its end faces it receives sealing washers 511c and 511d that are centered on the axes of the passages 513, thereby guaranteeing a sealed hydraulic fluid passage between the first element 510 and the subassembly 400, said hydraulic fluid passage serving to feed hydraulic energy to above-mentioned actuator 420. The radially outer surface of the sleeve 511a of the part 511 includes annular grooves on either side of the flange 511b for receiving O-rings 511e and 511f, with the O-ring 511f being situated beneath the flange 511b and guaranteeing sealing between the radially outer surface of the sleeve 511a and the radially inner surface of the first element 510.

The sealing part 511 is provided on the inside with a bushing 512 that is generally circularly cylindrical about the axis X, that is extended radially inwards from its inside surface at its bottom end by a collar 512, and that is extended at its top end from its outside surface by an annular flange 512c which is fixed against the top end edge of the sleeve 511a by means of bolts 512d. An O-ring 512a is interposed in sealed manner between the radially outer surface of the bushing 512 and the radially inner surface of the sleeve 511a. The bottom end face of the bushing 512 projects a little beneath the bottom end face of the part 511. An electrical contact support 512f fitted on both front faces with electrical pins 512g and 512h is positioned inside the bushing 512 and bears axially via its bottom front face against the collar 512b. The support 512f is prevented from rotating about the axis X by means of a screw 512i. The radially outer surface of the support 512f carries an O-ring 512j that closes the inside of the bushing 512 in sealed manner. The motor 514 is electrically connected to the pins 512h by means of a double female connector 516 that is bolted to the bottom face of the bushing 512 and that is partially received in a housing provided on the top front surface of the motor 514.

The shaft of the motor 514 extends below the bottom front face thereof to be coupled in conventional manner by coupling means 517 (also called an Oldham coupling) to a rod 521 mounted to rotate about the axis X and situated for the most part inside the second element 520. The top end of the rod 521 is connected to the coupling means 517, passes through the first sealing part 580 and extends downwards inside the second element 520 to about halfway along it. The bottom end of the rod 521 is tapped about the axis X to receive a control finger 525 that is of smaller diameter and whose function is explained below. The control finger 525 has a threaded outside surface on which there is engaged an assembly 525a constituted by a nut and a locknut, which assembly comes into abutment against the bottom end face of the rod 521. From its top end connected to the shaft of the motor 514, the rod 521 presents a section that is substantially constant to immediately below the first sealing part 580 where it enlarges to form a collar 521a. The portion of the rod 521 situated beneath the collar 521a has a threaded outside surface 521b. The rod 521 is guided in rotation by means of a needle bearing 580d placed in a cylindrical housing of the first sealing part 580 and opening out into the top front face thereof.

The rod 521 is kept axially in position firstly by axial abutment against the top front face of the first sealing part by means of a bearing 521c constrained to rotate with the rod 521 by means of a clamping screw 521d and resting via its bottom front face on a ball abutment 521e, and secondly by axial abutment against the bottom front face of the first sealing part by means of a roller abutment 521g placed axially between the top axial face of the collar 521a and a washer 521h placed at the bottom of a cylindrical housing 580b formed on the bottom front face of the first sealing part 580.

The ball abutment 521e is interposed axially between the bearing 521d and a washer 521f disposed at the bottom of a housing 580c that is circularly cylindrical about the axis X and that is provided on the top front face of the first sealing part 580. The ball abutment 521e is partially engaged in said housing 580c. The depth of the housing 580b is such that the bottom axial face of the collar 521a is set back a little from the bottom end face of the first sealing part 580.

The radially outer surface of the first sealing part 580 includes annular grooves on either side of the angular flange 580a serving to receive O-rings 580e and 580f that bear in sealed manner against the radially inner surfaces of the first and second elements 510 and 520 respectively. A composite gasket 580g is placed in a bore formed in the bottom of the housing 580b, is retained therein by the washer 521h, and bears in sealed manner against the rod 521. The first sealing part 580 includes sealing washers 580k that guarantee that the passages 513 and 532 intercommunicate therethrough in sealed manner.

The threaded outer surface 521b co-operates by screw engagement with a nut 521i having satellite rolls. The nut 521i drives a piston support 523 (or liner) in axial displacement along the axis X by means of a groove and notch link, which support is slidably mounted inside the second element 520. The piston support 523 is generally tubular in shape and includes on its radially inner surface at about one-third of its length from the bottom a collar 523b that projects radially inwards. A piston 586 is mounted to slide in sealed manner inside the piston support 523 beneath the collar 523b, and the piston 586 is held inside the piston support 523 by a nut 523c that is screwed into tapping formed at the bottom end thereof. The piston 586 includes an annular groove in its radially outer surface that receives an O-ring 586a bearing in sealed manner against the radially inner surface of the piston support 523. Preferably, and as shown, resilient return means (constituted in this case by a stack of Belleville spring washers 526) are placed between the collar 523b and the top front face of the piston 586 to exert a downwardly directed return force thereon.

On its radially outer surface, level with the collar 523b, the piston support 523 includes an annular groove for receiving a composite gasket 523d that bears in sealed manner against the radially inner surface of the second element. On its radially outer surface, the piston support 523 includes a longitudinal groove 523a situated above the composite gasket 523d, and the piston support 523 is prevented from rotating about the axis X by means of a cylindrical plug 706 inserted in a bore formed through the thickness of the wall of the second element 520, and projecting into the groove 523a. This plug 706 is held in place by a nut 707.

The piston 586 and the piston support 523 define a main chamber 530 inside the second element 520 and beneath the piston 586, and an auxiliary chamber 530a situated above the piston 586, both chambers being full of hydraulic fluid. The main chamber 530 is closed at the bottom by the top end face 581a of the second sealing part 581, and it communicates via a radial bore 534 formed slightly above said end face with one of the longitudinal passages 522 of the second element 520.

Figure 5C:
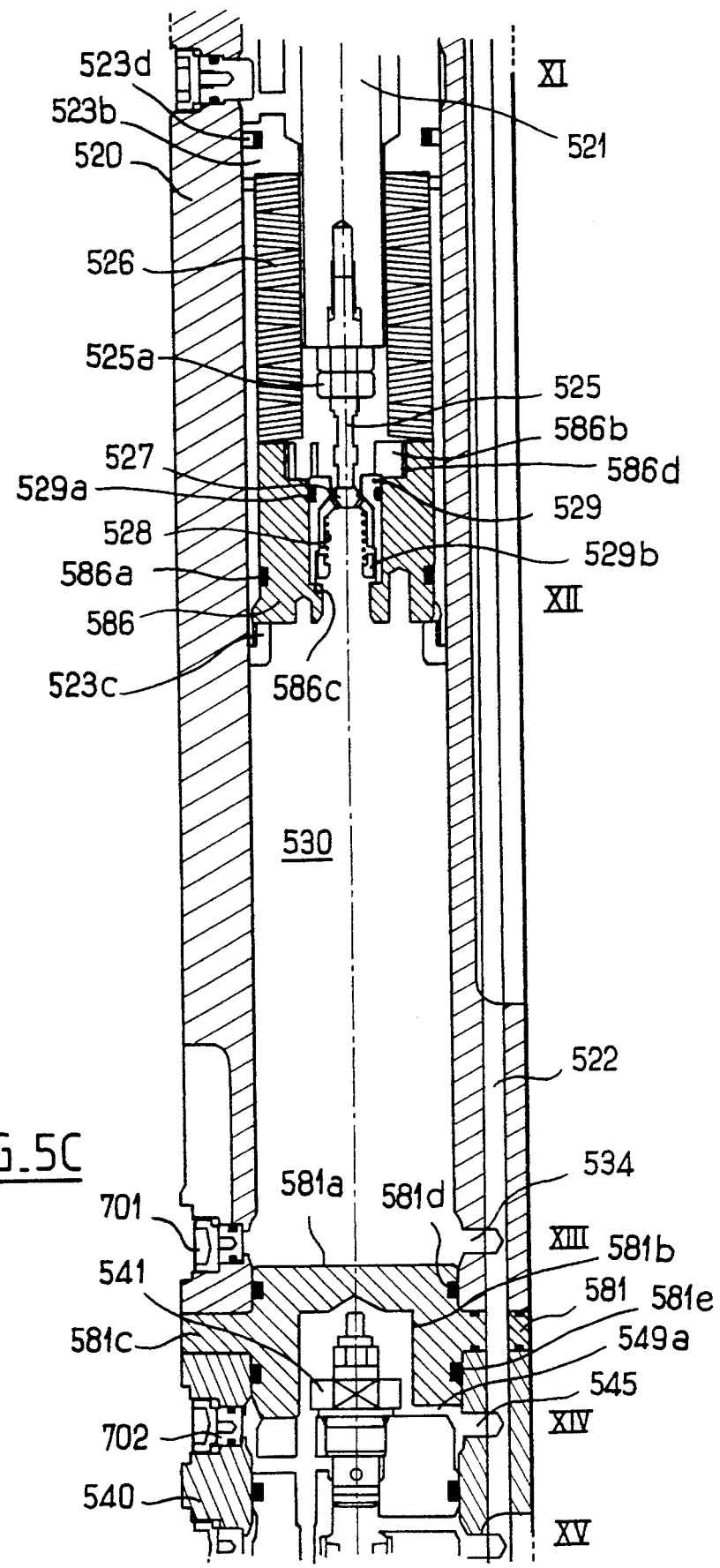

The inside of the piston 586 is provided with means forming a non-return valve to establish hydraulic fluid communication between the chambers 530 and 530a when the source of hydraulic pressure is at rest (as shown in FIG. 5c) i.e. when the piston 586 is fully raised inside the second element 520. More precisely, the piston 586 has a bore about the axis X and has a shoulder 586c set back a little from its bottom end face and projecting radially inwards into the bore formed therein. A valve seat 529 is generally tubular in shape narrowing inwardly at its top end and is inserted in said bore, coming into abutment via its bottom end face against the shoulder 586c, and the seat 529 is retained in the bore by means of a nut 586b screwed into tapping 586d formed on the top front face of the piston 586. Sealing is provided between the radially outer surface of the seat 529 and the bore of the piston 586 in which it is inserted by means of an O-ring 529a. A shutter 527 having an axial section in the form of an upside-down U-shape pierced by slots situated at the junction between the straight branches of the U-shape and its straight back and fitted with a sealing washer situated above said slots is slidably mounted inside the seat 529 and is retained therein by means of an externally threaded ring 529b screwed into tapping formed in the radially inner surface of the seat 529 and at its bottom end. The shutter 527 is urged upwards into its closure position against the narrowing of the seat 529 by a spring 528 that bears axially at its bottom end against the ring 529b. The shutter 527 is moved downwards off its seat 529 by the control finger 527 bearing against the back of the shutter 527 when the piston 586 is fully raised inside the second element 520, the volume of the main chamber 530 then being at a maximum. The pressure that obtains inside the two chambers 530 and 530a is then the same. When the motor 514 is caused to rotate in the appropriate direction, the threaded rod 521 drives the nut 521i, the piston support 523 moves downwards, and the finger 525 ceases to press against the shutter 527 which rises against the seat 529, thereby isolating the main chamber 530 from the auxiliary chamber 530a. As the piston continues to move down, the pressure of the hydraulic fluid in the main chamber 530 increases, and the piston 586 moves upwards a small distance relative to the piston support 523 under the effect of the pressure, thereby compressing the spring washers 526. The main hydraulic circuit is under pressure.

In the thickness of its wall, the second element 520 includes a fluid passage 532 passing through it lengthwise. This passage 532 is closed at its top end by the first sealing part 580 and it communicates with the auxiliary chamber 530a via a radial bore 531 situated immediately beneath the bottom end face of the first sealing part 580.

The outside shape of the second sealing part 581 is generally circularly cylindrical about the axis X, and about halfway up its radially outer surface it is extended by a flange 581c that is interposed between the end faces of the second and third elements. On its radially outer surface, the sealing part 581 includes annular grooves on either side of the annular flange 581c and receiving sealing rings 581d and 581e that are interposed in sealed manner between the radially outer surface of the part 581 and the radially inner surface of the second and third elements 520 and 540 respectively. The second sealing part 581 has a circularly cylindrical housing 581b about the axis X ion its bottom front face.

Figure 5D:
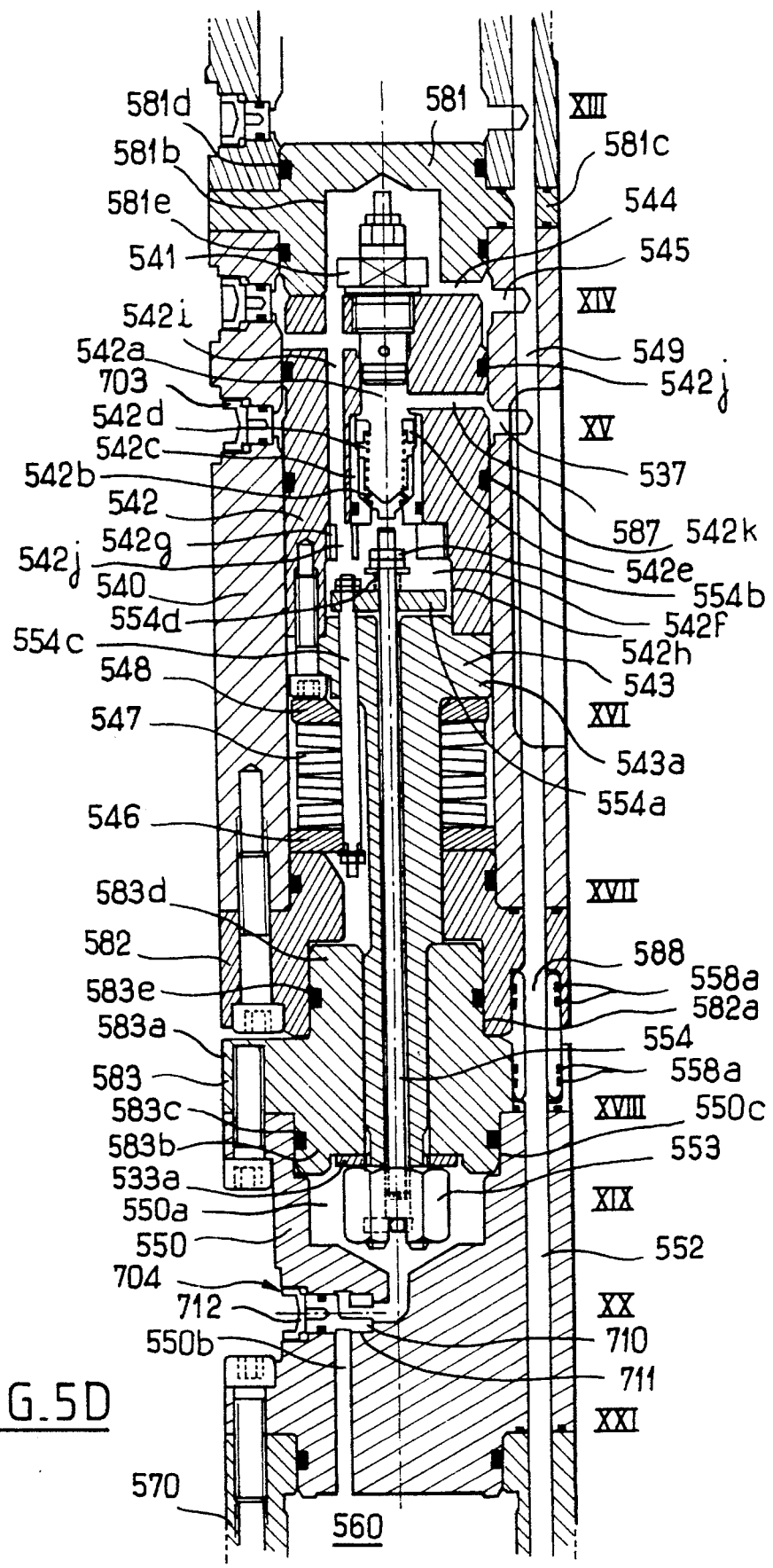
Figure 5F:
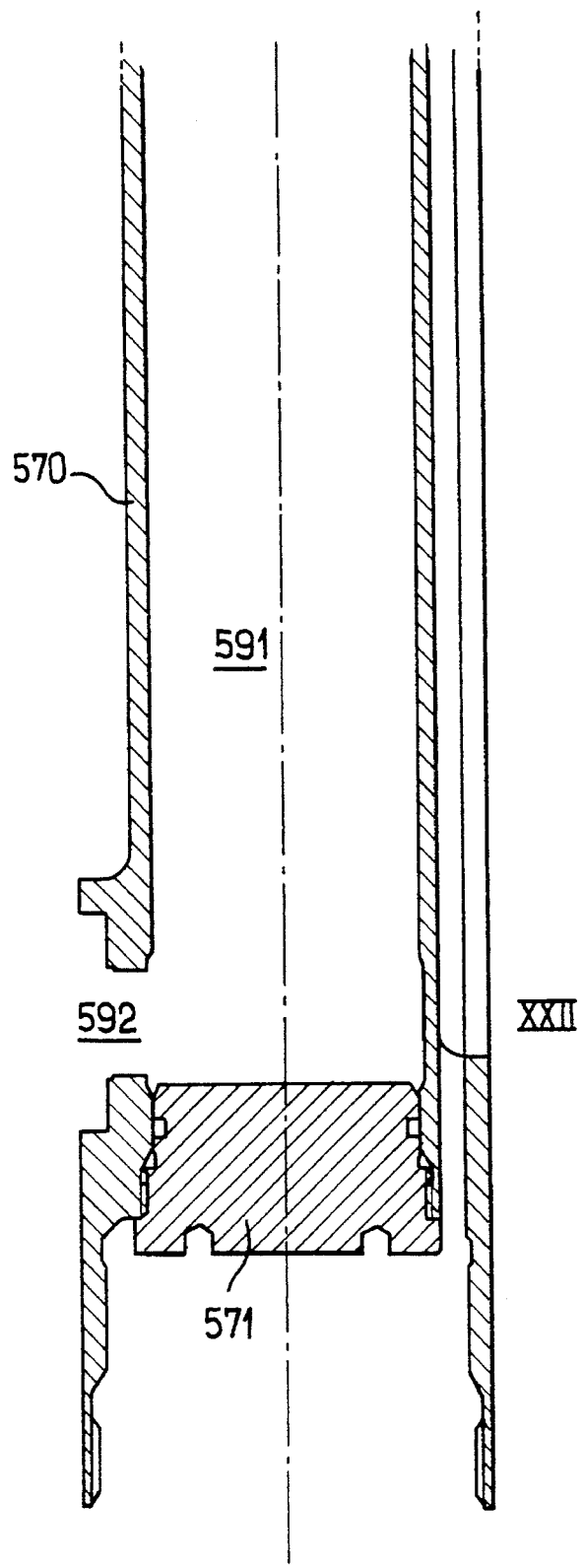

The third element 540 has a bore extending over a fraction of its length from its top end face in register with the passage 532 and then radially inwards at 545 to establish hydraulic fluid communication between the auxiliary chamber 530a and the housing 581b via an axial bore through the second sealing part 581, thereby forming a hydraulic circuit that is referred to below as the auxiliary hydraulic circuit. The bottom of this housing 581b is closed by a body 542 inserted inside the third element 540 and suitable for sliding therein. The body 542 comes into axial abutment in FIGS. 5C and 5D via its top end face against the bottom end face of the second sealing part 581. The bottom end face of the second sealing part includes radial recesses 544 enabling fluid communication to take place between the housing 581b and the bore 545. The housing 581b is thus in communication with the auxiliary chamber 530a.

The housing 581b also communicates via a hydraulic path that is described below with a hydrostatic pressure compensation chamber 560 provided inside the fourth element 570. More particularly, this compensation chamber 560 is delimited at its bottom end by a moving wall 590a constituted by the top face 590a of a piston 590 slidably mounted in sealed manner inside the fourth element 570. The volume 591 situated beneath the bottom front face 590b of the piston 590 inside the fourth element communicates with the outside via radial bores 592 that are provided set back from the bottom end of the fourth element 570. This volume 591 fills with drilling mud while the string is being lowered down the borehole. The fourth element 570 is closed beneath the bores 592 by a plug 571. The radially outer surface of the piston 590 includes three annular grooves that receive the following respectively, from top to bottom: a first guide segment of polytetrafluoroethylene 590c, a composite sealing gasket 590d, and a second guiding segment 590e identical to the first.

The center of the body 542 includes a circularly cylindrical cavity 542a about the axis X that communicates via a bore 587 of the body 542 and then via a bore 537 of the third element 540 with one of the above-mentioned passages 549, and thus with the main chamber 530. O-rings 542j and 542k are placed in annular grooves formed in the radially outer surface of the body 542 on either side of the bore 587 and bear in sealed manner against the radially inner surface of the third element. The top of the cavity 542a is defined by a pressure limiting valve 541 that opens out into the above-mentioned housing 581b. The valve 541 is adjusted to open when the pressure that obtains in the main hydraulic circuit, and thus in the cavity 542a is greater than a given threshold. Such opening causes fluid to pass from the cavity 542a towards the housing 581b, and thus from the main hydraulic circuit towards the auxiliary hydraulic circuit. This flow of fluid causes hydraulic fluid to come into the compensation chamber 560 and causes the piston 590 to move downwards. The bottom of the cavity 524a is defined by a non-return valve having a seat 542c that is tubular in shape and that tapers downwards, together with a shutter 542b of similar shape to the shutter 572 and urged downwards against the seat 542c towards the valve-closing position by a spring 542d retained in the seat 542c by means of a threaded ring 542e. The seat 542c is held in place in the body 542 by means of a nut 542g bearing against the bottom end face of the seat 542c. The non-return valve opens out downwards into a space 542f radially defined by the wall of a circular cylindrical housing 542h about the axis X that is formed in the bottom end face of the body 542 and axially delimited by the top front face of a control rod support 543 bolted against the bottom end face of the body 542.

In general, the control rod support 543 is circularly cylindrical about the axis X and its section tapers in steps in a downwards direction. The top portion of the control rod support 543 includes an annular flange 543a set back a little from its top end face and bolted to the body 542. The space 542f communicates via a longitudinal bore 542i of the body 542 and via an axial slot 542j of the nut 542g with the above-mentioned housing 581b. The control rod support 543 extends downwards beyond the bottom end face of the third element 540. The control rod support 543 has a bore on the axis X extending along its entire length for receiving a control rod 554 that is slidably mounted in said bore and that projects from both ends thereof.

The bottom end of the control rod support 543 opens out into a cavity 550a formed in the top front face of a part 550 that is bolted to the top end face of the fourth element 570. The bottom end face of the part 550 defines the top of the hydrostatic pressure compensation chamber 560. The part 550 includes longitudinal passages 552 that open out downwards in register with the passages 572 of the fourth element and that communicate in sealed manner therewith. The cavity 550a communicates via a passage 550b formed in the body of the part 550 with the compensation chamber 560 so that the pressure that obtains inside the cavity 550a is equal to ambient hydrostatic pressure.

A sealing part 583 is bolted to the top end face of the part 550 and defines the top of the cavity 550a. A sealing part 582 is bolted to the bottom end face of the third element 540.

The sealing part 583 is constituted by a body that is generally circularly cylindrical in shape about the axis X and that has an annular flange 583a about halfway up for bolting against the top end face of the part 550. The cylindrical bottom portion 583b of the part 583 situated beneath the flange 583a is inserted in a housing 550c that is circularly cylindrical about the axis X and that is formed in the top front face of the part 550, and it bears in sealed manner against the wall of said housing by means of a sealing gasket 583c. The cylindrical top portion 583d is of smaller diameter than the bottom cylindrical portion 583b and it is mounted to slide in sealed manner inside the cylindrical housing 582a formed in the bottom end face of the part 582. An O-ring 583e received in an annular groove formed in the radially outer surface of the top cylindrical portion 583d bears in sealed manner against the wall of the cylindrical housing 582a. The part 583 and the part 582 have housings in their facing faces that communicate respectively with the passages 552 and 549 and in which cylindrical tubes 558 are inserted that are provided on their radially outer surfaces with sealing gaskets 558a and that are suitable for sliding in sealed manner in said housings in order to put the passages 552 and 549 into communication in sealed manner.

Resilient return means constituted in the embodiment described by a stack of Belleville spring washers 547 threaded on the rod support 543 are held between two washers 546 and 548 bearing respectively against the top end face of the part 582 and against the bottom axial face of the collar 543a. These washers 547 exert an upwardly directed return force on the control rod support 543. This comes into abutment via a washer 553a held by a nut 553 screwed onto the bottom end of the control rod support 543 against the bottom end face of the part 583. The washers 547 thus tend to keep the flange 583a in axial abutment against the bottom end face of the part 582.

The control rod 554 is free to slide inside the rod support 543. A washer 554a is threaded on the top end of the rod 554 projecting beyond the support 543 and it is held thereon by means of an assembly 554b comprising a nut-and-locknut. A spring 554d is axially interposed between the nut-and-locknut assembly 554b and the top axial face of the washer 554a.

Three spacer-forming rods 554c pass through the collar 543a of the rod support 543, pass inside the resilient washers 547, and are secured at their ends to the washers 546 and 554a, such that moving the parts 582 and 583 apart causes the washer 554a to be lifted, thereby entraining the control rod 554 upwards. The length of the rod 554 that projects above the washer 554a is adjusted by means of the nut-and-locknut assembly 554b so that for a selected traction force on the cable 4 (equal to 1400 daN in the embodiment described) tending to move the parts 582 and 583 apart, the top end of the rod 554 bears against the shutter 542b, raises it, and establishes fluid communication between the space 542f and the cavity 542a, thereby causing the main hydraulic circuit to be put to ambient pressure by allowing fluid to flow towards the auxiliary hydraulic circuit that is in communication with the compensation chamber 560.

Tapped orifices opening to the outside of the module 3 and closed by bleed cocks are provided for the purpose of filling the apparatus with hydraulic fluid. More particularly, these bleed cocks are constituted by cylindrical plugs provided with respective O-rings and held in place by nuts. The subassembly 500 of the module 3 includes a first bleed cock 700 opening out into the top end of the auxiliary chamber 530 level with the bore 531. A second bleed cock 701 is provided at the base of the main chamber 530 level with the bore 534. A third bleed cock 702 situated immediately beneath the bottom end face of the second sealing part between the gaskets 581d and 542j communicates with the housing 581b. A fourth bleed cock 703 is provided level with the bore 545 and communicates with the space provided between the body 542 and the third element 540 between the O-rings 542j and 542k. A fifth bleed cock 704 fitted to the part 550 communicates with the passage 550b. The fifth bleed cock includes a hollow plug 710 engaged in a bore 711 of the part 550, having an axis perpendicular with the axis X, having an end that communicates with the cavity 550a, and having a cylindrical wall with a lateral opening that communicates with the compensation chamber 560 via a longitudinal bore 458 of the body of the part 550, thus constituting a portion of the above-mentioned passage 550b. The plug 710 is held by a nut 712. The plug 710 normally allows fluid communication between the cavity 550a and the compensation chamber 560. During maintenance of the module 3, an oil injection nozzle 800 can be engaged in the hollow plug 710 after the nut 712 has been removed. The nozzle 800 then closes the end of the bore 711 and includes a lateral orifice allowing hydraulic fluid to be injected into the compensation chamber 560 via the bore 558. Injecting fluid in this way causes the piston 590 to be moved downwards and expels any mud residue from the volume 591.

The bottom end of the fourth element is fitted with electrical connection means (not shown) to form the above-mentioned connector 599. Communication between the three passages 513 takes place at the top end of the first element, and the connection between the three passages 572 takes place at the bottom end of the fourth element.

Figure 25:
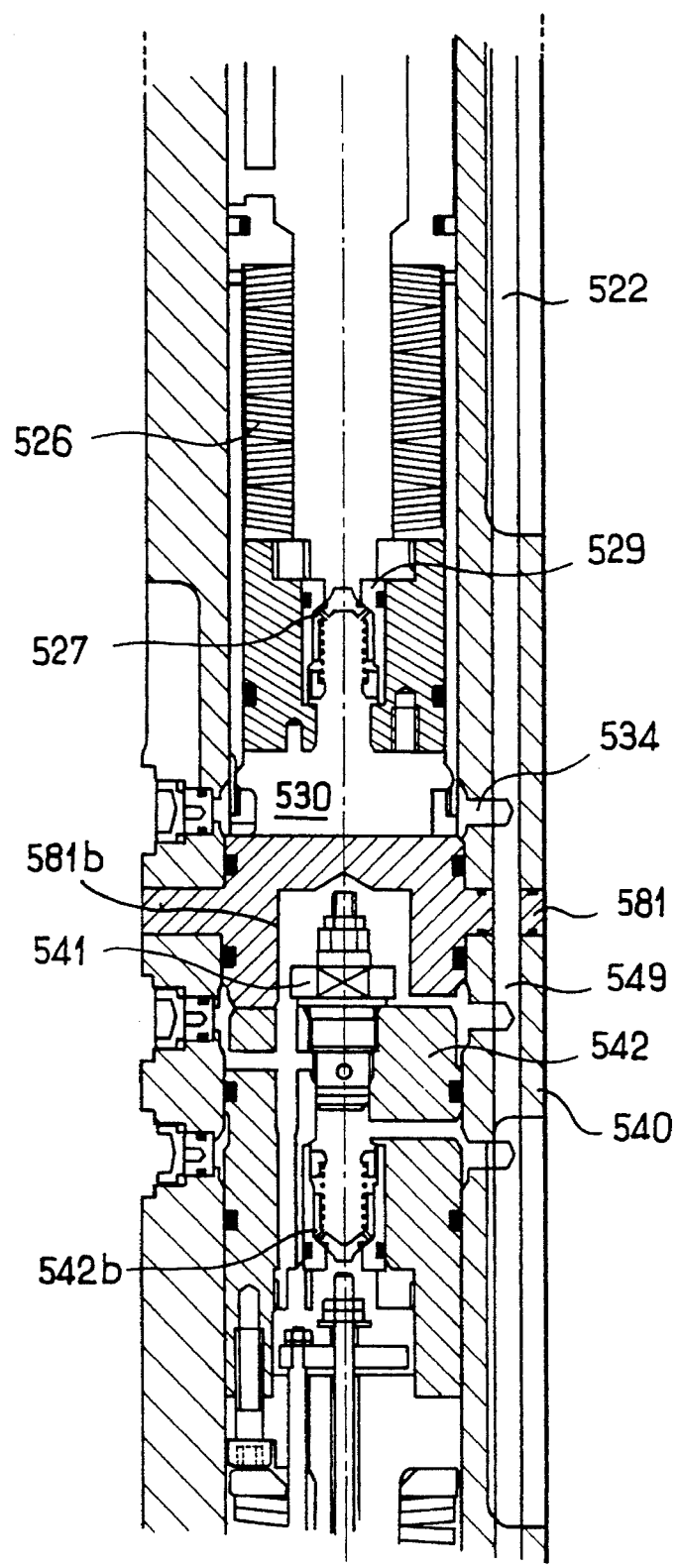
FIG. 25 is a fragmentary section showing the source of hydraulic pressure in its position for applying pressure to the hydraulic circuit connecting said source to the sondes.

The string of sondes is preferably used as follows. The string is lowered down a borehole by means of the cable 4, the anchor arms then being folded in and the non-return valve fitted to the piston 586 then being in its pressure-balancing position as shown in FIG. 5C. While lowering is taking place, the pressure that obtains inside the compensation chamber 560 is continuously in balance with ambient hydrostatic pressure. Since the non-return valve fitted to the piston 586 is open, the entire main hydraulic circuit is at the same pressure as the compensation chamber 560. At the desired depth, the motor 514 is powered with electricity from the surface to displace the piston support 523 and the piston 586 downwards until the position shown in FIG. 25 is reached. The non-return valve fitted to the piston 586 is closed and the main chamber 530 together with the main hydraulic circuit is under pressure. The stack of resilient washers 526 is compressed and thus makes it possible to accommodate a small amount of hydraulic leakage, for example. The valve 541 is closed and the shutter 542b is in its closed position. The actuators of the sondes are accentuated by putting the main hydraulic circuit under pressure, thereby moving the anchor arms away from the sondes until they bear against the wall of the borehole. Once an arm bears against the wall of the borehole, pressure rises rapidly and the motor 514 consumes a greater amount of electricity. By monitoring electricity consumption by the motor 514, it is possible to determine when it should be stopped. If the motor is stopped too late, thus giving rise to excessive pressure in the main hydraulic circuit, then the valve 541 opens to ensure that the pressure in the main hydraulic circuit is limited to an acceptable value. The sondes 2 are kept securely anchored in the borehole and they are ready to detect the arrival of seismic waves therein. Once measurements have been completed, the motor 514 is driven in the opposite direction (i.e. upwards to increase the volume of the chamber 530) so the anchor arms naturally fold in against the bodies of the sondes under the effect of hydrostatic pressure. The string is moved to a new depth or it is raised to the surface.

In the event of the motor 514 breaking down or of the electrical power supply to said motor breaking down while the arms are in the anchoring position, the means of the invention for applying ambient pressure can be brought into play merely by exerting sufficient traction force on the cable 4 to move the parts 582 and 583 apart through a distance e as shown in FIG. 24, thereby causing the shutter 542*b* to be lifted off its seat 542*c*. This puts the main chamber 530 into communication with the compensation chamber 560, thereby causing the main hydraulic circuit to be put to ambient pressure, and thus causing the anchor arms to be folded in.

I claim:

1. A string of sondes for use in a borehole to provide seismic signals when energized remotely, each sonde including hydraulically operable anchoring means adapted to being remotely operated for engaging the wall of the borehole as a result of hydraulic pressure in a hydraulic circuit, an elongated element supporting said sondes in a generally linear array so that said sondes can be deployed in the borehole and withdrawn from the borehole by applying a tension/traction force to said elongated element, said elongated element having a first part slideably receiving a second part thereof, and said hydraulic circuit having a vent passage defined by said first and second parts, valve means normally closing said vent passage to allow hydraulic pressure to operate said anchoring devices, and said vent passage acting to dump said hydraulic pressure to said anchoring devices when said first and second parts have moved relative to one another in response to tension/traction force in excess of a predetermined force.

2. The combination according to claim 1, wherein each sonde anchoring devices includes an anchor arm movably connected to the sonde and adapted to engage the wall of the borehole, and a single-acting hydraulic actuator connected at one end to said arm and at the other end to said sonde and accessible from outside the sonde when the arm is extended.

3. The combination according to claim 2, wherein said hydraulic actuator is pivotably connected at one end to said sonde, and wherein two links are provided at the opposite end of the hydraulic actuator, one of which links is pivotably connected to the sonde, and the other of said links being pivotably connected to the anchor arm whereby the force exerted by said anchor arm on the wall of the borehole increases with increasing diameter of the borehole.

4. The combination according to claim 3, wherein the range of borehole diameters accommodated by a string of sondes in accordance with the present invention may vary by a factor of 2.5 to 1.

5. The combination according to claim 1, wherein said slideably innerconnected parts of said elongated element are urged toward one another by resilient return means, and wherein said predetermined traction or tension force applied to said elongated element causes said parts to move apart from one another, and wherein said means provided in said vent passage comprises a non-return valve actuated by said element parts being so moved apart.

6. The combination according to claim 5, wherein said hydraulic circuit includes a hydrostatic pressure compensation chamber including a movable wall that is subject to ambient pressure in the borehole, and wherein said hydraulic pressure in said vent passage is dropped to the pressure provided in said hydrostatic pressure compensation chamber as a result of said parts of said elongated elements so moving apart.

7. The combination according to claim 1, wherein said sondes are provided in separated relationship one with respect to another by lengths of flexible cable, and said connections between said flexible cables and said sondes including anti-twisting sheaths.

8. The combination according to claim 1, wherein said sondes are connected to one another by links of rigid tubing.

9. The combination according to claim 1, wherein said predetermined tension/traction force lies in the range of 1200 daN to 1600 daN.

* * * * *